(12) United States Patent
Kobayashi

(10) Patent No.: US 6,424,359 B1
(45) Date of Patent: Jul. 23, 2002

(54) SCREEN SCROLL CONTROL METHOD AND RECORDING MEDIUM

(75) Inventor: Hiroshi Kobayashi, Niigata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/448,149

(22) Filed: Nov. 24, 1999

(30) Foreign Application Priority Data

Nov. 25, 1998 (JP) .............................. 10-349326

(51) Int. Cl.⁷ ................................. G06F 3/00
(52) U.S. Cl. ...................... 345/786; 345/784; 345/856; 345/973
(58) Field of Search ................. 345/767, 784, 345/786, 810, 821, 822, 832, 835, 846, 856, 858, 859, 860, 973

(56) References Cited

U.S. PATENT DOCUMENTS

| | | | | |
|---|---|---|---|---|
| 5,896,132 A | * | 4/1999 | Berstis et al. | 345/786 |
| 5,952,995 A | * | 9/1999 | Barnes | 345/784 X |
| 6,020,887 A | * | 2/2000 | Loring et al. | 345/786 |

* cited by examiner

*Primary Examiner*—John Cabeca
*Assistant Examiner*—X. L. Bautista
(74) *Attorney, Agent, or Firm*—Foley & Lardner

(57) ABSTRACT

A cursor is placed through the operation of a pointing device such as mouse on an icon showing an upward arrow displaced on one end of an vertical scroll bar, and the arrow direction changed cyclically from downward to right-hand, left-hand, upward then downward, each time the right button of the mouse is clicked. When the left mouse is clicked, with the arrow directed to the desired screen scroll direction, the screen is scroll in the direction of the arrow displayed actually.

13 Claims, 5 Drawing Sheets

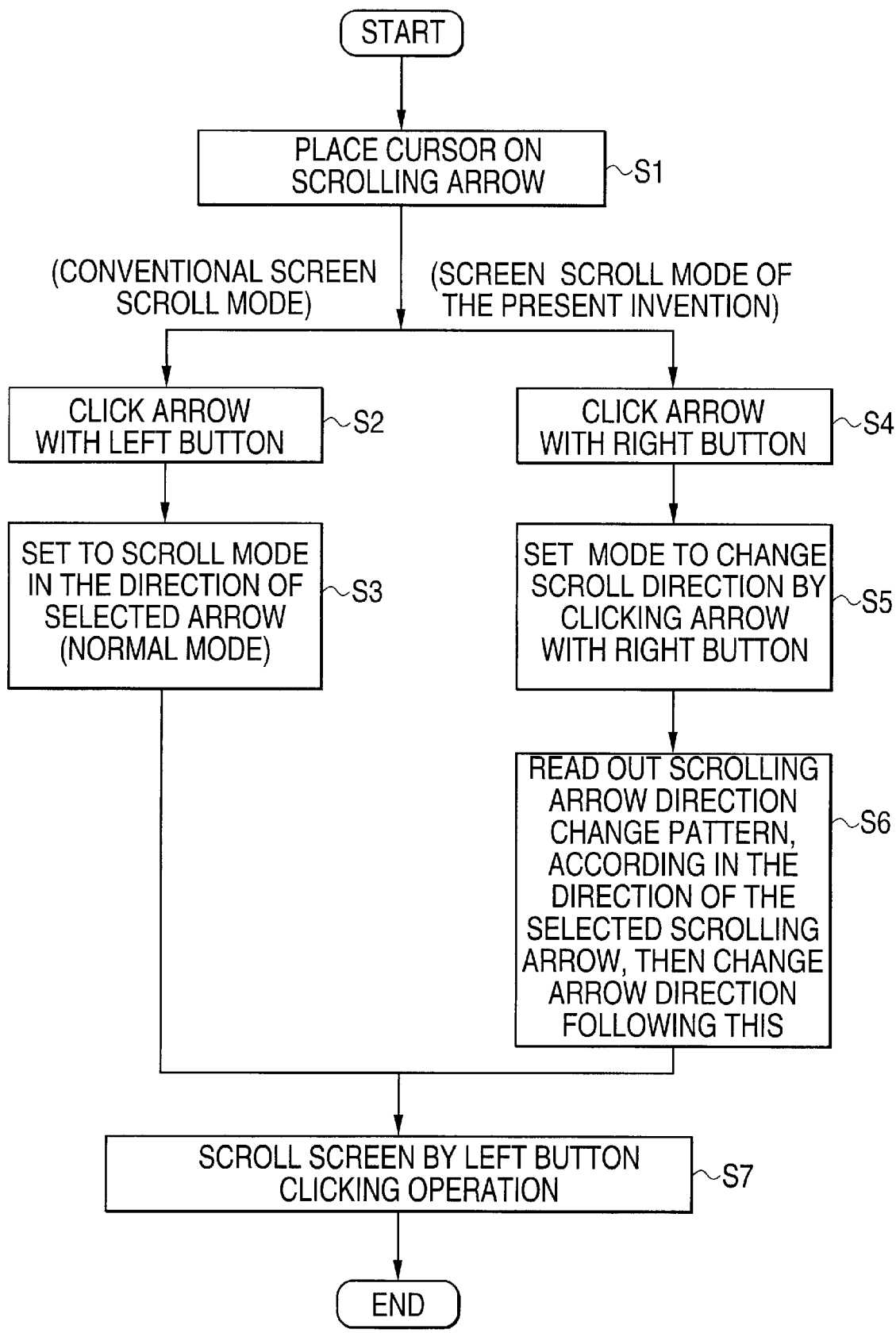

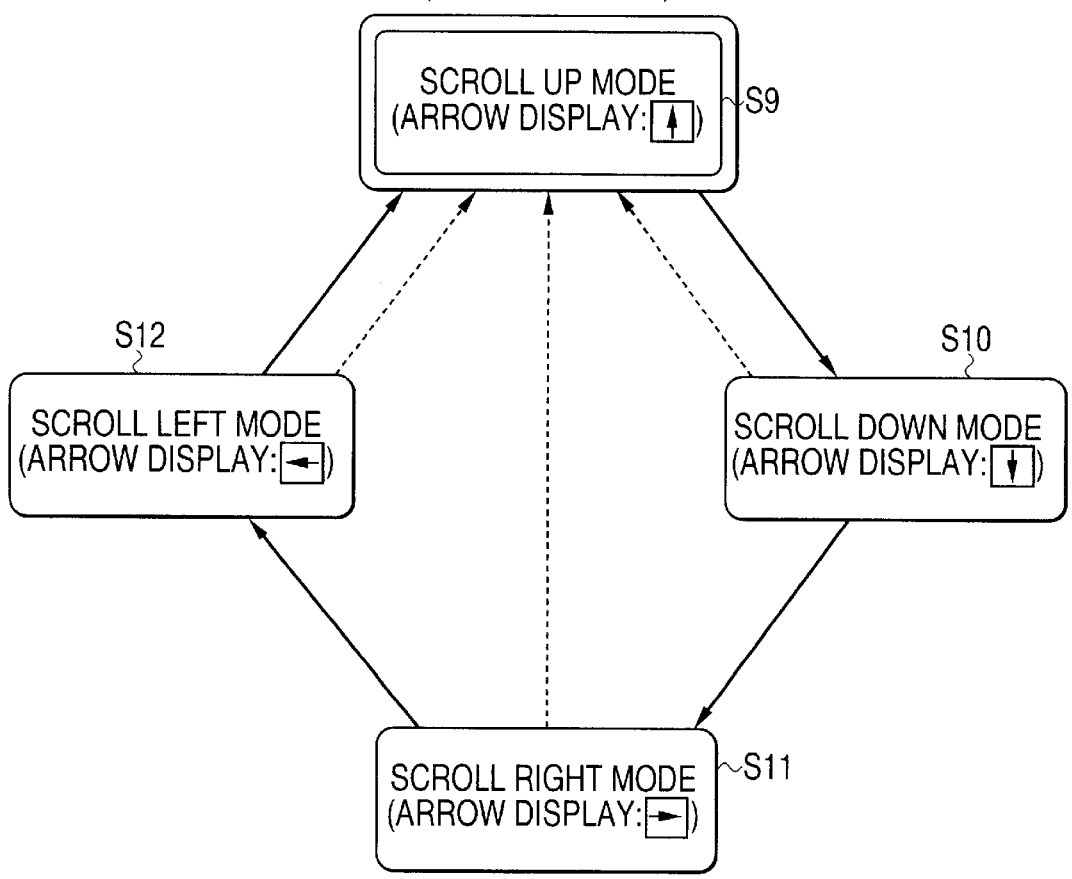

SCREEN SCROLL CONTROL METHOD AND RECORDING MEDIUM

BACKGROUND OF THE INVENTION

The present invention relates to a screen scroll control method and a recording medium, and more particularly a screen scroll control method for scrolling a screen, by clicking icons disposed at both ends of a scroll bar and a recording medium.

An example of the conventional screen scroll control method is described in Japanese Patent Laid-Open No. Hei 7-182135. As will later be described more in detail, this conventional screen scroll control method is characterized by that a cursor is moved onto a scroll up arrow, by the operation of a pointing device such as a mouse or the like, and when the same is selected, a copy of a scroll down arrow is dynamically created, in a vertical scroll bar adjacent to the scroll up arrow to facilitate the scroll direction change operation.

However, this conventional technique had the following drawback. That is, though the operation amount could be made small as for vertical scroll direction change or horizontal scroll direction change, still a large operation of the pointing device has been required for the vertical to horizontal scroll direction change or the horizontal to vertical scroll direction change.

This reason is because the copy of scroll arrow dynamically created next to the selected scroll arrow is created only for the scroll arrow in opposition in the direction of the selected scroll arrow.

SUMMARY OF THE INVENTION

It is therefore an object of the present invention to minimize the movement of a pointing device such as a mouse to scroll a screen vertically or horizontally, and to scroll the screen effectively.

Other objects of the present invention will become clear as the description proceeds.

According to an aspect of the present invention, there is provided a screen scroll control method for scrolling a screen vertically or horizontally by putting a cursor on a scroll icon using a pointing device and clicking, comprising the steps of displaying a first icon for indicating the screen upward scroll on one end of the vertical scroll bar, displaying a second icon for indicating the screen downward scroll on the other end, displaying a third icon for indicating the screen scroll to the left on one end of the horizontal scroll bar, and displaying a first fourth for indicating the screen scroll to the right on the other end of the horizontal scroll bar; placing the cursor on the predetermined one of the first to fourth icons by means of the pointing device, and replacing cyclically one of the first to fourth icons on which the cursor is placed with the first to fourth icons, each time when a predetermined first button of said pointing device is operated; and scrolling the screen in a direction corresponding to the one of the first to fourth icons on which the cursor is placed, each time when a predetermined second button of the pointing device is operated.

According to another aspect of the present invention, there is also provided a screen scroll control method for scrolling a screen vertically or horizontally by putting a cursor on a scroll icon using a pointing device and then clicking, comprising the steps of displaying a first icon for indicating the screen upward scroll on one end of the vertical scroll bar, displaying a second icon for indicating the screen downward scroll on the other end, displaying a third icon for indicating the screen scroll to the left on one end of the horizontal scroll bar, and displaying a first fourth for indicating the screen scroll to the right on the other end of the horizontal scroll bar; placing the cursor on the predetermined one of the first to fourth icons by means of the pointing device, and displaying the first to fourth icons in a popup menu, when a predetermined first button of said pointing device is operated; replacing one of the first to fourth icons on which the cursor is placed with the one selected in the popup menu, when any one of the first to fourth icons displayed in the popup menu is selected; and scrolling the screen in a direction corresponding to the one of the first to fourth icons on which the cursor is placed, when the predetermined second button of the pointing device is operated.

More, the first icon may be composed of an upward arrow, the second icon composed of a downward arrow, the third icon composed of a left-hand arrow and the fourth icon composed of a right-hand arrow.

Further, the pointing device may be a mouse.

Furthermore the first icon may be composed of an upward arrow, the second icon composed of a downward arrow, the third icon composed of a left-hand arrow and the fourth icon composed of a right-hand arrow, and the arrow direction of the first to fourth icons may be made to change cyclically upward, downward, to the left and to the right each time when the cursor is placed on the predetermined one of the first to fourth icons by means of the pointing device, and the predetermined first button of the pointing device is clicked.

Besides, when the predetermined one of the first to fourth icons is displayed replaced by the other one, if the first or second button of the pointing device is clicked, the predetermined one of the first to fourth icons displayed by being replaced with the other one may be made to return to the previous display state.

Moreover, when the predetermined one of the first to fourth icons is displayed replaced by the other one, if a predetermined period of time has elapsed, the predetermined one of the first to fourth icons displayed by being replaced with the other one may be made to return to the previous display state.

The recording medium of the present invention is characterized by that a program for executing the screen scroll control method mentioned above is stored.

In the screen scroll control method and the recording medium according to the present invention, a first icon for indicating the screen upward scroll and a second icon for indicating the screen downward scroll are displayed on the both ends of a vertical scroll bar, a third icon for indicating the screen scroll to the left and a first fourth for indicating the screen scroll to the right are displayed on the both ends of the horizontal scroll bar; a cursor is placed on the predetermined one of the first to fourth icons by means of the pointing device, and one of the first to fourth icons on which the cursor is placed is replaced cyclically with the first to fourth icons; and the screen is scrolled in a direction corresponding to the one of the first to fourth icons on which the cursor is placed, each time when a predetermined second button of the pointing device is clicked.

BRIEF DESCRIPTION OF THE DRAWINGS

FIG. 5 is a flow chart illustrating the operation of the first embodiment shown in FIG. 2;

FIG. 6 shows a scroll mode change pattern; and

DETAILED DESCRIPTION OF THE PREFERRED EMBODIMENTS

Figure 1:
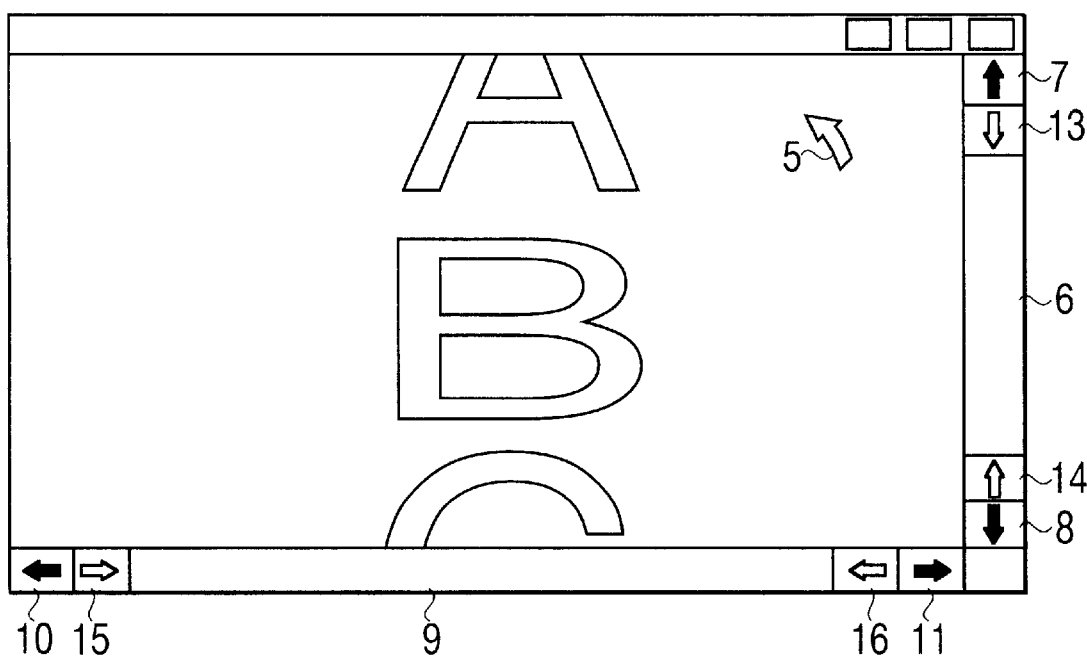
FIG. 1 is a view for illustrating a conventional screen scroll control method.

Referring to FIG. 1, description is at first made about a conventional screen scroll control method in order to facilitate an understanding of the present invention.

As mentioned in the preamble of the instant specification, the conventional screen scroll control method is characterized by that a cursor 5 is moved onto a scroll up arrow 7, by the operation of a pointing device such as a mouse or the like, and when the same is selected, a copy 13 of a scroll down arrow 8 is dynamically created, in a vertical scroll bar 6 adjacent to the scroll up arrow 7 to facilitate the scroll direction change operation, as illustrated in FIG. 1.

Likewise, when the scroll down arrow 8 is selected, a copy 14 of the scroll up arrow 7 is created, when a scroll left arrow 10 is selected, a copy 15 of a scroll right arrow 11 is created, and when the scroll right arrow 11 is selected, a copy 16 of the scroll left arrow 10 is created respectively.

Note that these copy 13 of the scroll down arrow 8, the copy 14 of the scroll up arrow 7, the copy 15 of the scroll right arrow 11, and the copy 16 of the scroll left arrow 10 are deleted automatically, if the scroll operation is not performed using arrows for scroll such as scroll up arrow 7, scroll down arrow 8, scroll left arrow 10 and scroll left arrow 10.

However, this conventional technique had the following drawback. That is, though the operation amount could be made small as for vertical scroll direction change or horizontal scroll direction change, still a large operation of the pointing device has been required for the vertical to horizontal scroll direction change or the horizontal to vertical scroll direction change.

This reason is because the copy of scroll arrow dynamically created next to the selected scroll arrow is created only for the scroll arrow in opposition in the direction of the selected scroll arrow.

Referring to FIG. 2 through FIG. 6, description will proceed to a screen scroll control method according to a first embodiment of the present invention.

Figure 2:
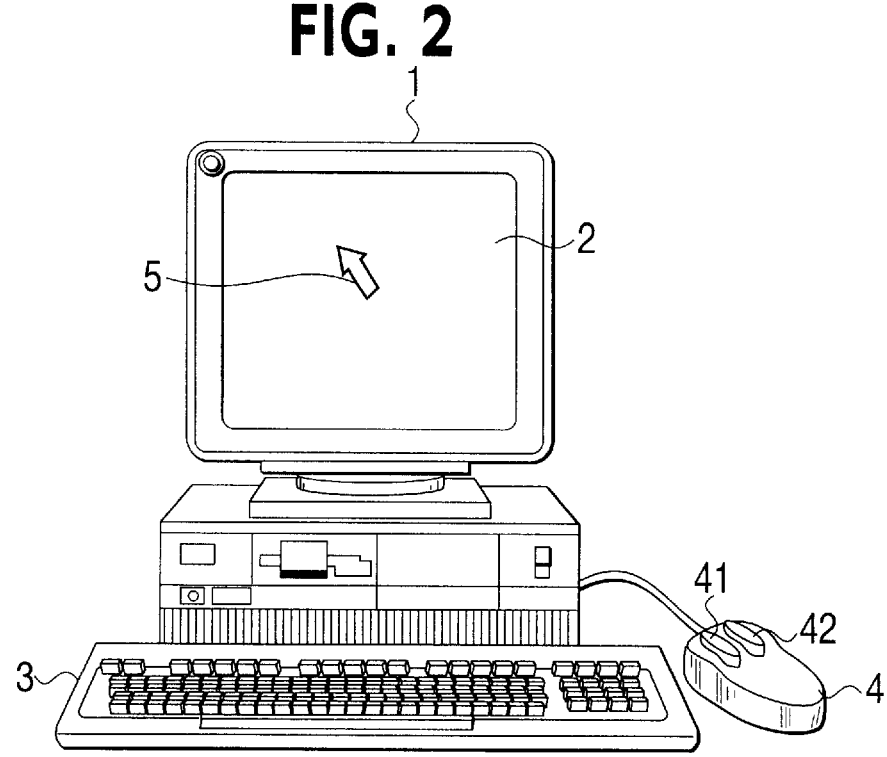
FIG. 2 is a general view of a personal computer to which a screen scroll control method according to a first embodiment of the present invention is to be applied.

FIG. 2 shows an example of composition of a general personal computer to which the screen scroll control method is applied. The personal computer 1 comprises, as shown in FIG. 2, a keyboard 3 as input device, a pointing device 4 such as a mouse, and a monitor 2 as screen display device.

The pointing device 4 is used to move a cursor 5 on a screen displayed on the monitor 2 and comprises a left button 41 used for the operation such as selection or decision and a right button 42 used for the operation such as menu call.

Figure 3:
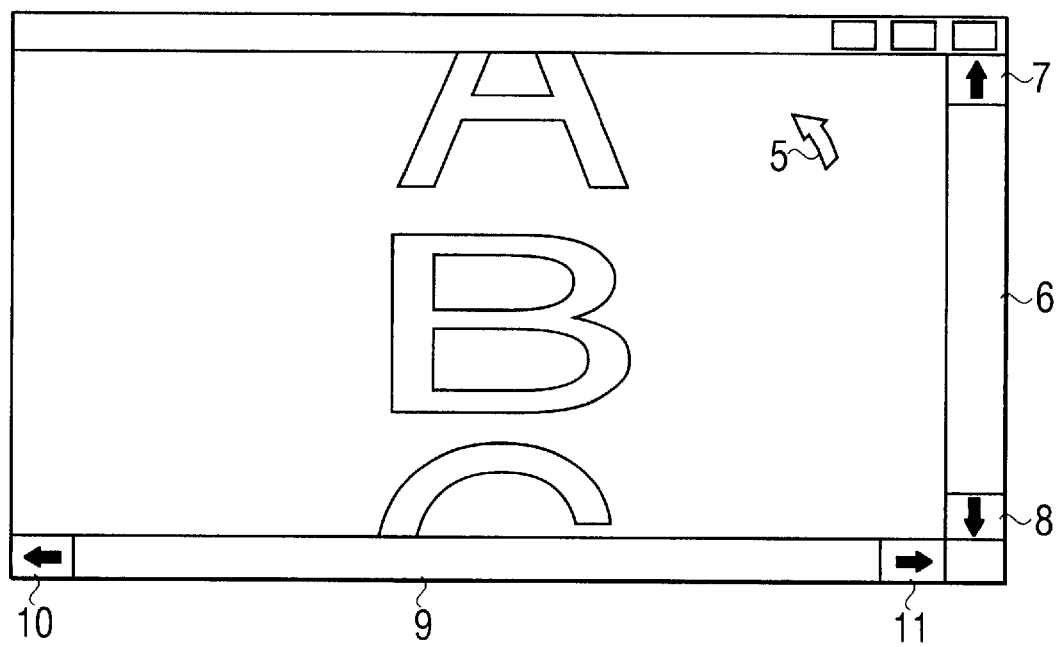
FIG. 3 shows an example of display screen of a general Windows application.

FIG. 3 is an example of the screen display of a general Windows application, displayed on the monitor 2 of the personal computer 1 shown in FIG. 2. The monitor 2 displays screen data by the Windows application, in a window format as shown in FIG. 3; however, as all the screen data can not be displayed at once, some auxiliary means are displayed on the screen to realize the display by scrolling.

That is, they are a vertical scroll bar 6, a horizontal scroll bar 9, and a scroll up arrow icon 7 disposed at one end of the vertical scroll bar 6, a scroll down arrow icon 8 disposed at the other end, a scroll left arrow icon 10 disposed at one end of the horizontal scroll bar 9 and a scroll right arrow icon 11 disposed at the other end. Hereinafter, the arrow icon will be described simply as an arrow, and scroll up arrow icon 7, scroll down arrow icon 8, scroll left arrow icon 10 and scroll right arrow icon 11 will be collectively described simply as scrolling arrows unless it is not especially required to distinguish them.

The screen scroll is realized by moving the cursor 5 on these scrolling arrows by operating the pointing device 4 such as a mouse, and clicking it.

The screen scroll operation may be realized by the key operation of the keyboard 3 (cursor key, page up/down key, or the like), however, is more effective to operate said scrolling arrows using the pointing device 4.

The screen scroll operation by means of the pointing device 4 can be realized by placing the cursor 5 on the scrolling arrows 7, 8, 10, 11 operating the pointing device 4, and by clicking the respective arrows with the left button 41 of the pointing device 4.

Moreover, in this embodiment, in addition to said scroll control, vertical or horizontal screen scroll control can be realized using only one arrow among scroll up arrow 7, scroll down arrow 8, scroll left arrow 10 and scroll right arrow 11.

For instance, when performing the screen scroll using the scroll up arrow 7, a normal scroll up operation can be started, by placing the cursor 5 on the scroll up arrow 7 first through the operation of the pointing device 4 and by continuing to click the left button on the pointing device 4. This is the state shown FIG. 4A. However, after having placed the cursor 5 on the scroll up arrow 7, when immediate scroll up operation by the left button 41 is not performed, and the right button 42 is clicked, the default scroll up arrow 7 will change to the scroll down arrow 7a (FIG. 4B), scroll right arrow 7b (FIG. 4C), or scroll left arrow 7c (FIG. 4D) or the like each time when the button is clicked, allowing to scroll toward respective direction.

In consequence, the screen can be scrolled in the desired direction, by repeating to click the right button of the pointing device 4 until the scrolling arrow in the desired direction appears and by clicking the left button 41 when the scrolling arrow in the desired direction appears. Note that the scroll direction change order shown in FIGS. 4A through 4D is nothing but an example, and as for the order, it can be set arbitrarily.

Concerning, scroll down arrow 8, scroll left arrow 10 and scroll right arrow 11, as it is similar to the case of the scroll up arrow 7, the description thereof will be omitted herein.

Now, referring to FIG. 5 and FIG. 6, the operation of this embodiment will be described in detail. The screen scroll operation using the pointing device 4 starts, first of all, by placing the cursor 5 on one the scroll up arrow 7, scroll down arrow 8, scroll left arrow 10 and scroll right arrow 11 through the operation of the pointing device 4 (step S1 in FIG. 5).

Thereafter, when the scrolling arrow on which the cursor 5 is placed is clicked, with the left button 41 of the pointing device 4 (step S2), the scroll mode is changed to the normal mode (step S3), allowing to enter the screen scroll operation immediate by the left button 41 clicking operation (step S7), the scrolling arrow remaining in default without direction change.

For instance, if the cursor 5 is placed on the scroll up arrow 7 and the left button 41 clicked, the arrow direction of the scroll up arrow 7 remains for scroll up (remains upward) without change, and then a continuous clicking of the left button 41 allows to realize the screen scroll up operation.

On the other hand, after having placed the cursor 5 on one of respective scrolling arrows, when this scrolling arrow is clicked with the right button 42 of the pointing device (step S4), the screen mode enters a mode wherein the direction of the scrolling arrow can be changed by the right button 42 clicking operation (step S5), and the arrow direction is changed, by reading out the predetermined scrolling arrow direction change pattern, according in the direction of the selected scrolling arrow (step S6). Thereafter, the clicking operation by the left button 41 allows to enter the screen scroll operation (step S7).

Here, the detail operation of the step S6 will be described taking the case of the screen scroll operation using the scroll up arrow 7. FIG. 6 is a change pattern chart showing an example of scroll mode change. As shown in the change pattern chart of FIG. 6, in case of this example, each time when the right button 42 is clicked, the scroll direction changes, in default state, to scroll up, then scroll down, then scroll right, then scroll left and so on; however, this change pattern is an example for the explication, and the scrolling arrow direction change pattern can be set arbitrarily.

First, as for the state of scroll up mode S9 of FIG. 6, this corresponds to the state of step S1 of FIG. 5. This is the default state, and remaining in this state, the screen scroll up can be realized, by performing the clicking operation of the left button 41 of the pointing device 4.

The scroll mode changes, as shown in FIG. 6, starting from the scroll up mode S9 which is the default state, to the scroll down mode S10, the scroll right mode S11 and the scroll left mode S12, each time when the right button 42 of the pointing device 4 is clicked, and the fourth clicking operation of the right button 42 allows to return to the default scroll up mode S9.

The scroll operation in the scroll down mode S10, the scroll right mode S11 and the scroll left mode S12 can be realized, similarly in case of the scroll up mode S9 mentioned above, by clicking the left button 41 of the pointing device 4, in respective scroll mode.

Figure 4A:
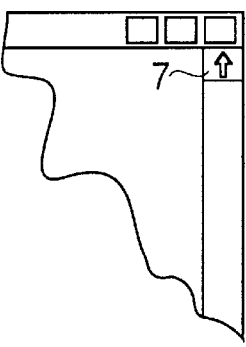
FIGS. 4A to 4D show a change of a scrolling arrow through right clicking of a mouse 4.
Figure 4B:
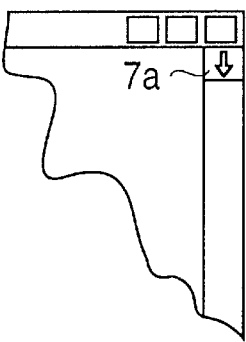
Figure 4C:
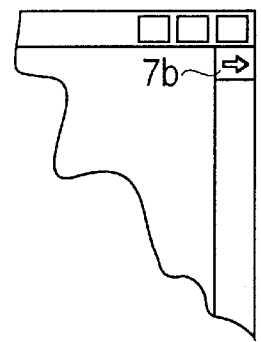
Figure 4D:
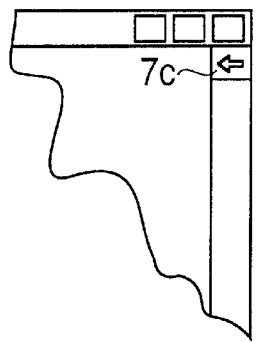
Figure 7A:
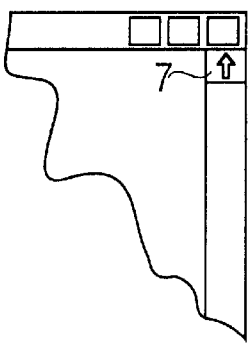
FIGS. 7A to 7D show an example of scroll direction selection within a pull down menu in a screen scroll control method according to a second embodiment of the present invention.
Figure 7B:
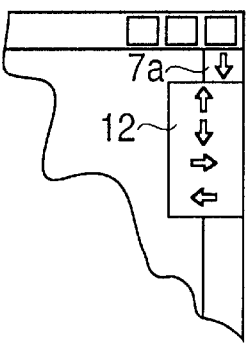
Figure 7C:
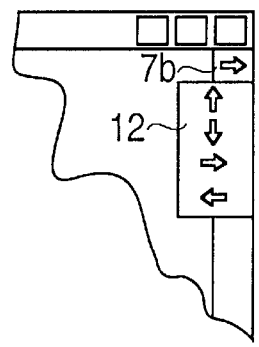
Figure 7D:
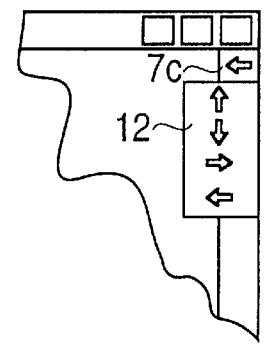

Additionally, the direction of scrolling arrows according to the change of the scroll mode is also indicated in FIG. 6, however the screen image corresponding to this change mode is illustrated in FIG. 4 too, the screen display of the scroll up mode S9 of FIG. 6 corresponding to FIG. 4A, the screen display of the scroll down mode S10 of FIG. 6 to FIG. 4B, the screen display of the scroll right mode S11 of FIG. 6 to FIG. 4C and the screen display of the scroll left mode S12 of FIG. 6 to FIG. 4D.

Next, the method to return to the default state scroll up mode S9 from the scroll down mode S10, the scroll right mode S11 and the scroll left mode S12 will be described.

For instance, it may be so composed to return automatically to the scroll up mode S9, when the pointing device 4 is operated (clicking operation or the like of the left button 41, and the right button 42) in a state where the cursor 5 is placed at the point other than the scrolling arrow used for the scroll operation.

Moreover, it may be so composed to return automatically to the scroll up mode S9, when a timer has determined that a predetermined reference time has elapsed, without button operation, even when the button of the pointing device 4 has not been operated.

Though the description has been made referring to the example of the scroll up arrow 7 herein above, concerning the other the scroll down arrow 8, scroll left arrow 10 and scroll right arrow 9, the operation is basically similar to the case of the scroll up arrow 7.

As described above, the following effects can be obtained, by the embodiment mentioned above. That is, the vertical or horizontal screen scroll becomes possible by the pointing device 4, using only one scrolling arrow. For instance, when the scroll up and the scroll right are to be performed sequentially, the leading time to start the screen scroll can be shortened, by making unnecessary the operation to move the cursor 5 between the scroll up arrow 7 and the scroll right arrow 11 separated each other.

Similarly, when the scroll up and the scroll left are performed sequentially, or when the scroll down and the scroll left are performed sequentially, the leading time to start the screen scroll can be shortened.

This reason is because, the direction of the scrolling arrow can be changed to the desired scroll direction, by placing the cursor 5 on one scrolling arrows and performing the clicking operation with the right button 42 of the pointing device 4.

Now, referring to FIG. 7, description will proceed to a screen scroll control method according to a second embodiment of the present invention. FIG. 6 is an example of display screen to which the screen scroll control method of this embodiment is applied.

In this embodiment, as mentioned above referring to FIG. 4, in addition to the function of the first embodiment mentioned above wherein the direction of the scrolling arrow can be changed by performing the clicking operation with the right button 42 of the pointing device 4, it becomes possible to select the scroll direction, within a pull down menu 12, by adding a function to display the pull down menu 12, as shown in FIG. 7.

Therefore, the user can choose a easier method to operate, between the method for changing the scrolling arrow, through the clicking operation of the right button 42 of the pointing device 4, and the method for selecting the scrolling direction from the pull down menu 12.

Moreover, for instance, in the scroll up arrow 7, the pull down menu 12 is not displayed for the default scroll arrow direction (FIG. 7A) by clicking the right button 42 of the pointing device 4, but it is only displayed when the arrow direction is changed (FIG. 7B, 7C, 7D), and erased when the scroll arrow direction returns to the default state. It is similar as for the scroll down arrow 8, the scroll left arrow 10 and the scroll right arrow 11.

Moreover, in the aforementioned embodiment, the present invention applied to an application operating on a desk top type personal computer has been described; however, the invention is not limited to this, but it can also be applied to applications or the like operating on a notebook type personal computer having a small display screen size, or the other portable information terminals.

Moreover, in the aforementioned embodiment shown in FIG. 7, the method for changing the scrolling arrow by performing the clicking operation of the right button 42 of the pointing device 4, or the method for selecting the scroll direction from the pull down menu 12 could be chosen, however, it can also be made to perform the screen scroll control only by the method for selecting the scroll direction from the pull down menu 12.

As described above, the screen scroll control method according to the present invention, comprises the steps of displaying a first icon for indicating the screen upward scroll on one end of the vertical scroll bar, displaying a second icon for indicating the screen downward scroll on the other end, displaying a third icon for indicating the screen scroll to the left on one end of the horizontal scroll bar, and displaying a fourth icon for indicating the screen scroll to the right on the other end of the horizontal scroll bar; placing the cursor on the predetermined one of the first to fourth icons by means of the pointing device, and replacing cyclically one of the first to fourth icons on which the cursor is placed with the first to fourth icons, each time when the predetermined first button of the pointing device is clicked, this allows to limit as much as possible the cursor movement for the screen scroll operation and it becomes possible to reduce the lead time to start the screen scroll and to perform the screen scroll operation effectively.

What is claimed is:

1. A screen scroll control method for scrolling a screen vertically or horizontally by putting a cursor on a scroll icon using a pointing device and then clicking, comprising the steps of:

displaying a first icon for indicating the screen upward scroll on one end of the vertical scroll bar, displaying a second icon for indicating the screen downward scroll on the other end, displaying a third icon for indicating the screen scroll to the left on one end of the horizontal scroll bar, and displaying a fourth icon for indicating the screen scroll to the right on the other end of the horizontal scroll bar;

placing the cursor on the predetermined one of said first to fourth icons by means of said pointing device, and replacing cyclically one of said first to fourth icons on which said cursor is placed with said first to fourth icons, each time when a predetermined first button of said pointing device is operated; and scrolling said screen in a direction corresponding to the one of said first to fourth icons on which said cursor is placed, each time when a predetermined second button of said pointing device is operated.

2. The screen scroll control method of claim 1, wherein said first icon is composed of an upward arrow, the second icon is composed of a downward arrow, the third icon is composed of a left-hand arrow and the fourth icon is composed of a right-hand arrow.

3. The screen scroll control method of claim 1, wherein said pointing device is a mouse.

4. The screen scroll control method of claim 1, wherein said first icon is composed of an upward arrow, the second icon is composed of a downward arrow, the third icon is composed of a left-hand arrow and the fourth icon is composed of a right-hand arrow, and the predetermined first button of said pointing device is clicked, the arrow direction of said first to fourth icons changes cyclically upward, downward, to the left or to the right, each time when the cursor is placed on the predetermined one of said first to fourth icons by means of said pointing device.

5. The screen scroll control method of claim 1, wherein said cursor is placed on a point excepting said first to fourth icons in a state which said predetermined one of said first to fourth icons is displayed by being replaced with the other one, said predetermined one of said first to fourth icons displayed by being replaced with the other one returns to the previous display state, when said first or second button of said pointing device is clicked.

6. The screen scroll control method of claim 1, wherein said predetermined one of said first to fourth icons displayed by being replaced with the other one returns to the previous display state, in a state which said predetermined one of said first to fourth icons is displayed by being replaced with the other one, when a predetermined period of time has elapsed.

7. A screen scroll control method for scrolling a screen vertically or horizontally by putting a cursor on a scroll icon using a pointing device and then clicking, comprising the steps of:

displaying a first icon for indicating the screen upward scroll on one end of the vertical scroll bar, displaying a second icon for indicating the screen downward scroll on the other end, displaying a third icon for indicating the screen scroll to the left on one end of the horizontal scroll bar, and displaying a fourth icon for indicating the screen scroll to the right on the other end of the horizontal scroll bar;

placing the cursor on the predetermined one of said first to fourth icons by means of said pointing device, and displaying said first to fourth icons in a popup menu, when a predetermined first button of said pointing device is operated;

replacing one of said first to fourth icons on which said cursor is placed with the one selected in said popup menu, when any one of said first to fourth icons displayed in said popup menu is selected; and scrolling said screen in a direction corresponding to the one of said first to fourth icons on which said cursor is placed, when the predetermined second button of said pointing device is operated.

8. The screen scroll control method of claim 7, wherein said first icon is composed of an upward arrow, the second icon is composed of a downward arrow, the third icon is composed of a left-hand arrow and the fourth icon is composed of a right-hand arrow.

9. The screen scroll control method of claim 7, wherein said pointing device is a mouse.

10. The screen scroll control method of claim 7, wherein said cursor is placed on a point excepting said first to fourth icons in a state which said predetermined one of said first to fourth icons is displayed by being replaced with the other one, said predetermined one of said first to fourth icons displayed by being replaced with the other one returns to the previous display state, when said first or second button of said pointing device is clicked.

11. The screen scroll control method of claim 7, wherein said predetermined one of said first to fourth icons displayed by being replaced with the other one returns to the previous display state, in a state which said predetermined one of said first to fourth icons is displayed by being replaced with the other one, when a predetermined period of time has elapsed.

12. A recording medium for storing a program of screen scroll control for scrolling a screen vertically or horizontally by putting a cursor on a scroll icon using a pointing device and then clicking, said program comprising:

displaying a first icon for indicating the screen upward scroll on one end of the vertical scroll bar, displaying a second icon for indicating the screen downward scroll on the other end, displaying a third icon for indicating the screen scroll to the left on one end of the horizontal scroll bar, and displaying a fourth icon for indicating the screen scroll to the right on the other end of the horizontal scroll bar;

placing the cursor on the predetermined one of said first to fourth icons by means of said pointing device, and replacing cyclically one of said first to fourth icons on which said cursor is placed with said first to fourth icons, each time when a predetermined first button of said pointing device is operated; and scrolling said screen in a direction corresponding to the one of said first to fourth icons on which said cursor is placed, each time when a predetermined second button of said pointing device is operated.

13. A recording medium for storing a program of screen scroll control for scrolling a screen vertically or horizontally by putting a cursor on a scroll icon using a pointing device and then clicking, said program comprising:

displaying a first icon for indicating the screen upward scroll on one end of the vertical scroll bar, displaying a second icon for indicating the screen downward scroll on the other end, displaying a third icon for indicating the screen scroll to the left on one end of the horizontal scroll bar, and displaying a fourth icon for indicating the screen scroll to the right on the other end of the horizontal scroll bar;

placing the cursor on the predetermined one of said first to fourth icons by means of said pointing device, and displaying said first to fourth icons in a popup menu, when a predetermined first button of said pointing device is operated;

replacing one of said first to fourth icons on which said cursor is placed with the one selected in said popup menu, when any one of said first to fourth icons displayed in said popup menu is selected; and scrolling said screen in a direction corresponding to the one of said first to fourth icons on which said cursor is placed, when the predetermined second button of said pointing device is operated.

* * * * *